No. 663,438. Patented Dec. 11, 1900.
J. J. HINDE.
METHOD OF FORMING CURVED ARTICLES FROM CELLUFORM BOARD.
(Application filed Jan. 22, 1900.)
(No Model.)
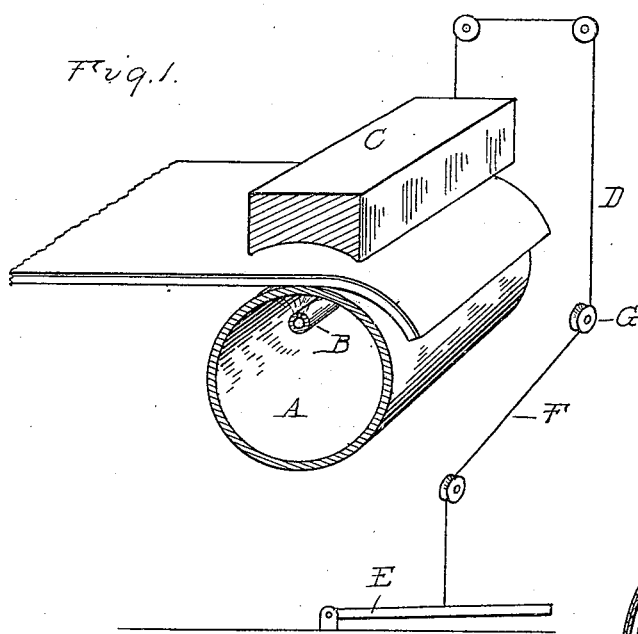
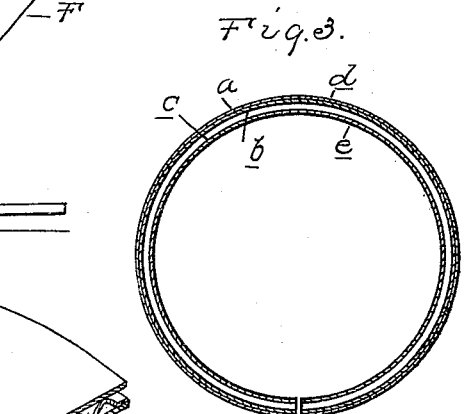
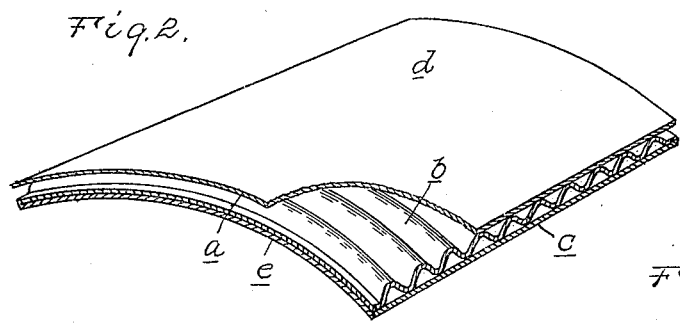
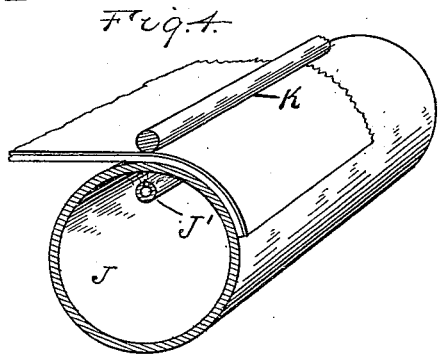
Witnesses
H. C. Smith
W. B. Dogherty
Inventor
James J. Hinde.
By Macquer & Son
Attys.
THE NORRIS PETERS CO., PHOTO-LITHO., WASHINGTON, D. C.

UNITED STATES PATENT OFFICE.

JAMES J. HINDE, OF SANDUSKY, OHIO.

METHOD OF FORMING CURVED ARTICLES FROM CELLUFORM BOARD.

SPECIFICATION forming part of Letters Patent No. 663,438, dated December 11, 1900.

Application filed January 22, 1900. Serial No. 2,381. (No model.)

*To all whom it may concern:*

Be it known that I, JAMES J. HINDE, a citizen of the United States, residing at Sandusky, in the county of Erie and State of Ohio, have invented certain new and useful Improvements in Methods of Forming Curved Articles from Celluform Board, of which the following is a specification, reference being had therein to the accompanying drawings.

The invention has reference to articles composed of celluform board, and relates particularly to a method of forming the articles to produce rigid structures.

The term "celluform board" is used by the trade to designate a strawboard structure consisting of three superimposed layers of the material referred to, the inner one being corrugated and the series secured together by means of any suitable adhesive substance. Various articles have heretofore been made from this type of board, but in all cases have lacked the element of rigidity owing to the fact that the boards were necessarily bent along lines parallel with the corrugations or else the latter were scored and purposely broken to permit of the bending being effected. In both cases the resulting structure was a collapsible body.

The present invention consists in the method of forming curved articles from celluform board, whereby the corrugations will be caused to extend unbroken and circumferentially about the article, constituting strengthening flanges or braces for the body, thereby producing a rigid structure.

In the drawings, Figure 1 is a diagrammatic illustration of a form of apparatus by the aid of which the method may be carried out. Fig. 2 is a sectional perspective view of a formed article. Fig. 3 is a section through a cylinder formed by the method hereinafter described, and Fig. 4 is a diagrammatic illustration of a modified form of apparatus.

The mechanism that I preferably employ in carrying out my method consists of a shaping-mandrel A, supported in any suitable manner and having arranged therein a suitable burner B, by means of which heat is imparted to the mandrel.

C is a shaping-block arranged in operative relation to the mandrel, and D is the mechanism for moving the block into and out of engagement with said mandrel. I have shown this mechanism as consisting of a foot-treadle E and a suitable cable F, passing over sheaves G. The board from which the articles are formed comprises, as before stated, three superimposed layers $a$, $b$, and $c$, the inner layer $b$ being corrugated and the series secured to each other.

In carrying out my method the board just described is moistened in any suitable manner, so as to place the same in condition to be readily shaped. A section or strip of the board employed to form the article is inserted between the mandrel A and the shaping-block, with its corrugations extending transversely of the mandrel. The shaping-block is then slowly lowered upon the mandrel, and the section of board is gradually curved in such manner as not to break the corrugations. As the result of the bending of the board the outer or convex surface $d$ is expanded and is under tension, while the inner or convex surface $e$ is contracted. Simultaneously with the bending of the board heat is imparted by induction to its concave surface and the latter is rapidly dried, it being preferably held in contact with the mandrel until the drying has been completely effected. The inner surface when dried is of sufficient rigidity to counteract the tension exerted upon it by the convex surface, and the form of the board as shaped by the mechanism is retained. In case it is merely a single curved section of board that is to be formed, such as that shown in Fig. 2, said section is then removed from the shaping-mandrel and the convex surface allowed to dry gradually by subjecting it to the action of the atmosphere.

Where the article that is to be formed is tubular, such as that shown in Fig. 3, a strip of board of sufficient length is employed and the first step of my method is repeated until the board is formed into the cylinder desired. In Fig. 1 I have shown the end portion of a strip of board curved as the result of the first step of the method, and by continuing these steps successively a structure in the form of a tube may be obtained.

While I have shown and described one way of carrying out my method, I do not desire to be limited to the same, as the various steps set forth may be modified within certain limits without in any manner departing from the spirit of my invention. Thus in Fig. 4 I have shown the mechanism as consisting merely of a shaping-mandrel J heated in any suitable manner, as by a burner J' and a single guide-roller K, arranged above and in operative relation to the mandrel. To form the article, the board to be bent, after being slightly moistened, is inserted at one end between the roller and heated mandrel and is caused to be moved slowly therebetween, the corrugations in the board extending circumferentially of the mandrel, as before described. Heat is thus applied to one surface of the board transversely to the lines of the corrugations, and the rapid drying of the surface as the result of the application of the heat causes the board to curve naturally about the mandrel into the desired form. After the curving has been effected in the manner set forth the outer or convex surface is allowed to gradually dry.

It will be obvious from the description of the method that the bending of the board is readily effected without in any way destroying or injuring the corrugations thereof, and the manner of arranging the corrugations is such that an article of superior strength and rigidity may be obtained. Such articles, particularly when in a tubular form, may be employed as bodies for packing-boxes, barrels, or kegs, and on account of the cheapness of the material from which they are formed can be produced at comparatively small cost.

I wish it to be clearly understood that by the term "celluform board" as used throughout the present specification I mean any board composed to two spaced layers of strawboard having arranged therebetween a cellular structure of any kind which ties the layers together. Also I consider my invention of sufficient breadth to cover broadly the art of curving a board of the type referred to in any manner, regardless of the direction in which the raised portions of the interposed cellular structure—such, for instance, as the corrugations—may extend.

What I claim as my invention is—

1. The herein-described method of forming curved articles from celluform board which consists in first moistening the board, in then curving said board by applying heat to one surface thereof, and finally gradually drying the opposite surface of the board after the curving of the latter has been effected.

2. The herein-described method of forming curved articles from celluform board, which consists in first moistening the board, in then curving the board in the direction of the corrugations by applying heat to one surface transversely to the line of said corrugations, and finally gradually drying the opposite surface of the board after the curving of the latter has been effected.

3. The herein-described method of forming tubular bodies from celluform board, which consists in first moistening the board, in then curving said board into tubular form, with the corrugations extending unbroken and circumferentially, by heating by conduction one surface of the board transversely of the corrugations, and finally gradually drying the opposite surface of the board after the curving of the latter has been effected.

In testimony whereof I affix my signature in presence of two witnesses.

JAMES J. HINDE.

Witnesses:
EDWARD NOEL,
THEODORE GERALD.